(12) United States Patent
Obata

(10) Patent No.: US 6,318,495 B1
(45) Date of Patent: Nov. 20, 2001

(54) POWER STEERING APPARATUS

(75) Inventor: Yoshifumi Obata, Sakurai (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/473,126

(22) Filed: Dec. 28, 1999

(30) Foreign Application Priority Data

Dec. 28, 1998 (JP) .................................... 10-374720
Dec. 16, 1999 (JP) .................................... 11-358175

(51) Int. Cl.⁷ .................................................. B62D 5/065
(52) U.S. Cl. ............................................ 180/422; 180/441
(58) Field of Search ................................. 180/417, 421, 180/422, 423, 434, 441, 442; 701/41

(56) References Cited

U.S. PATENT DOCUMENTS 5,711,394 * 1/1998 Fujii et al. ........................... 180/422
5,785,144 * 7/1998 Cakmaz et al. ..................... 180/422
5,928,298 * 7/1999 Matsuoka et al. ................... 180/446
6,069,460 * 5/2000 Grabowski et al. ................. 180/434

FOREIGN PATENT DOCUMENTS

A-6206554    7/1994 (JP) .

* cited by examiner

Primary Examiner—Anne Marie Boehler
(74) Attorney, Agent, or Firm—Birch, Stewart, Kolasch & Birch, LLP

(57) ABSTRACT

A power steering apparatus that is arranged in that hydraulic force to be supplied to a hydraulic cylinder is in a condition in which the hydraulic force is not raised even though an electric motor performs stand-by operations when a steering angle or an input torque is smaller than a predetermined value, and in that smooth steering is enabled without causing abrupt changes in hydraulic force when the steering angle or the input torgue exceeds the predetermined value and the electric motor is started driving at proper revolutions according to operations of a steering wheel.

20 Claims, 12 Drawing Sheets

POWER STEERING APPARATUS

BACKGROUND OF THE INVENTION

The present invention relates to a power steering apparatus of hydraulic type that comprises a control valve for supplying hydraulic oil from a hydraulic pump that is driven by an electric motor to a hydraulic cylinder for assisting steering.

A hydraulic type power steering apparatus is arranged in that it comprises a hydraulic cylinder (power cylinder) that is disposed in a steering mechanism of a vehicle to serve as a generating means of steer-assisting force and a hydraulic control valve for performing supply and drainage of hydraulic oil in accordance with operations of a steering wheel, wherein hydraulic oil that is supplied from the hydraulic pump that serves as a hydraulic oil source to the hydraulic control valve is further transferred to the hydraulic cylinder in accordance with operations of the steering wheel to apply hydraulic force (steer-assisting force) that is generated by the hydraulic cylinder in response to the transmission to the steering mechanism, as a result labor and burden of a driver required for steering decrease.

A commonly utilized hydraulic control valve is a valve of rotational type having a valve body and a valve spool that are fitted to each other such that a relative angular displacement is generated in accordance with torsion in a torsion bar that connects an input shaft connected to the steering wheel to an output shaft connected to the steering mechanism. In this arrangement, the valve spool is integrally formed will either one of the input shaft and the output shaft at a connecting portion between the input shaft and the output shaft connected by the torsion bar and value body is connected to the other, such that relative angular displacement according to torsion in the torsion bar are generated between the valve body and the valve spool.

An inner peripheral surface of the valve body is provided with a plurality of first oil grooves at equal intervals which extend in a longitudinal direction, and an outer peripheral surface of the valve spool is provided with a plurality of second oil grooves which are arranged in zigzag positions with the first oil grooves. Throttles are formed between the first and second oil grooves that are adjacent to each other in a peripheral direction, for details, formed between groove edges on each sides in a width direction of the respective oil grooves. The second oil grooves work as oil supply chambers and oil drain chambers at intervals of one. The first oil grooves work on oil transfer chambers between the oil supply chambers and oil drain chambers. Note that the oil supply chambers are communicated to a discharge portion of the hydraulic pump that serves as the hydraulic source, the oil drain chambers are communicated to an oil tank that serves as a destination of drained oil, and the oil transfer chambers are alternately communicated to both cylinder chambers of the hydraulic cylinder that serves as a destination of transferred oil.

In the above arrangement, when input torque (steering torque) is applied to the steering wheel, relative angular displacement is generated in accordance with torsion in the torsion bar between the input shaft and the output shaft, that is, the valve body and the valve spool, so that throttle areas of the throttles are varied. Consequently, hydraulic oil that is supplied from the hydraulic pump is supplied by passing through the throttles with increased throttle areas to the adjoining oil transfer chambers on the same side of the throttles. The hydraulic cylinder then generates hydraulic force according to pressure differences that are generated between the oil chambers on the other side so that the hydraulic force is applied to the steering mechanism as steer-assisting force.

A power steering apparatus comprising a hydraulic control valve performing the above operations is disclosed, for instance, in Japanese Patent Application Laid-Open No. 6-206554 (1994). FIG. 1 is a view showing characteristics of open of throttles and hydraulic force with respect to steering torque of the power steering apparatus. The longitudinal axis represents hydraulic force and throttle open and the lateral axis represents steering torque.

In this power steering apparatus, an electric motor is not driven in a dead zone, namely, until the throttles are completely closed so that no steer-assisting force is generated; however, the electric motor is started driving from the point the throttles are completely closed, and thereafter, control of revolutions is performed in proportion as steering torque is varied, so that hydraulic force can increase in proportion as steering torque increases.

However, in such a conventional power steering apparatus, a corresponding relationship (assisting force characteristics) between steering torque that is applied to the steering wheel and the steer-assisting force that is obtained in accordance with the steering torque therewith is indiscriminately determined by a spring coefficient (torsion characteristics) of the torsion bar for connecting the input shaft and the output shaft. Further, while the assisting force characteristics such that the steer-assisting force increases in proportion to increase in steering torque are obtained, such characteristics are not favorable in performing steering of a vehicle.

That is, steering of a vehicle is performed against reaction force of a road surface acting on wheels for steering (which are generally front wheels), and the degree of reaction force of the road surface is dependent on delay in vehicle speed as well as degree of steering angle, respectively. Due to this reason, when the spring coefficient of the torsion bar is selected to be small with a reference being a large amount of steering at the time of suspension or at the time of low speed running, it is presented a drawback in that steering is performed at a slight force applied to the steering wheel during high speed running to affect stability in straight-ahead running. On the other hand, when the spring coefficient of the torsion bar is selected to be large with a reference being a small amount of steering during high speed running, it is presented a drawback in that satisfactory steer-assisting force can not be obtained at the time of performing steering during suspension, so-called placed-turning, for which a large force is required.

In order to eliminate such drawbacks, the applicants are developing a power steering apparatus that employs a steering angle sensor for detecting a steering angle of a steering means such as a steering wheel, wherein a steering angular velocity of the steering means is obtained by using the detected steering angle, and when the steering angle is equal to or smaller than a predetermined value, the revolutions of the electric motor is made to be equal to or smaller than a predetermined value whereas when the steering angle exceeds the predetermined value, the revolutions of the electric motor is controlled in accordance with the steering angular velocity of the steering means.

However, in such a power steering apparatus that is arranged in that the revolutions of the electric motor is made not to exceeds the predetermined value when the steering angle is equal to or smaller than the predetermined value, and the revolutions of the electric motor is controlled in accordance with the steering angular velocity of the steering means when the steering angle has exceeded the predetermined value, it was presented a drawback in that in case the predetermined value for the steering angle set in the steering angle sensor is set to be approximately 1° to 2° and thus small, the electric motor is driven every time the steering means is steered by approximately 1° to 2° and thus frequently, to result in generation of steer-assisting force. Therefore, it is preferable that the predetermined value for the steering angle be set to be large to approximately 3° to secure proper play such that the electric motor can be prevented from being driven frequently.

FIG. 2 is a hydraulic characteristics view showing a relationship between input torque that is applied to the steering means and hydraulic force that is controlled by the control valve. The longitudinal axis represents hydraulic force and the lateral axis input torque. As it is evident from FIG. 2, the degree of increase in input torque becomes smaller accompanying the increase in hydraulic force that is controlled by the control valve.

However, in case the predetermined value for the steering angle is set to be large to approximately 3°, it may be that the driver feels a sense of being tensioned during steering when the steering angle has once exceeded the predetermined value from a steering neutral point of the steering means.

Upon pursuing for reasons causing this sense of being tensioned, it has been found the sense of being tensioned during steering was caused owing to become in discontinuous input torque in C in FIG. 2 due to the following reasons: During a period until the steering angle reaches the set predetermined value θ in FIG. 2, relative angular displacements are caused for the valve body and the valve spool of the control valve in manual condition and the pressure of hydraulic oil that is supplied to the hydraulic cylinder is in a slowly rising condition, for example, shows the characteristics at a flow rate of 1.0 l/min of supplied hydraulic oil (a in FIG. 2). When the steering angle has exceeded the set predetermined value θ, the electric motor is controlled in accordance with the steering angular velocity and hydraulic oil is abruptly supplied from the hydraulic pump to the control valve that is already in a condition in which the pressure of the hydraulic oil can be rising. As a consequence, the condition of the control value shifts to a condition in the characteristics at a flow rate of 2.0 l/min of supplied hydraulic oil. (b in FIG. 2)

BRIEF SUMMARY OF THE INVENTION

The present invention has been made for the purpose of solving the above problems, and it is an object of the present invention to provide a power steering apparatus that is capable of eliminating a sense of being tensioned when steer-assisting force is generated.

The power steering apparatus according to the present invention is a power steering apparatus for applying steer-assisting force to a steering mechanism in accordance with operations of a steering means, the apparatus comprising a steering angle detector for detecting a steering angle of the steering means; a control value through hydraulic oil flows from a hydraulic pump that is driven by an electric motor, being located between the hydraulic pump and hydraulic cylinder for steer-assisting; and a controller for setting the electric motor not to exceed predetermined revolutions when the steering angle is equal to or smaller than a predetermined value, and for performing control of revolutions of the electric motor in accordance with a steering angular velocity of the steering means when the steering angle exceeds the predetermined value, wherein when the steering angle is smaller than the predetermined value, the power steering apparatus is constituted in that a pressure of the hydraulic oil to be supplied to the hydraulic cylinder comes to be not raised.

In the present invention, when the steering angle is equal to or smaller than a predetermined value, the electric motor is in a condition in which its driving is suspended or in which it is performing stand-by operations at revolutions that does not exceed a predetermined value, and when the steering angle has exceeded the predetermined value in the course of steering, the electric motor is driven or the revolutions of the electric motor is increased. When the steering angle is equal to or smaller than the predetermined value, the pressure of hydraulic oil to be supplied from the control valve to the hydraulic cylinder comes to be not raised so that the hydraulic force is not increased even through the electric motor is performing stand-by operations. Such a condition of the control value can be realized by setting throttle degree of throttles of the control valve, that is, by setting shape, clearance and size for the throttles until the predetermined value is reached. The throttle degree is decided by the steering angle, that is, a rotation angle (a torsion angle) between the input shaft and the output shaft. The throttle degree depends on a spring coefficient of a connecting shaft such as a torsion far.

When the steering angle has exceeded a final point of a condition in which the hydraulic force is not increased in the course of steering, hydraulic force can be continuously increased from the condition in which the hydraulic force is not raised, by the electric motor of which speed is already increased by the driving or the stand-by operation, and steering can be performed in a smooth manner while generating no abrupt changes in hydraulic force at the time the electric motor is started driving at proper revolutions in accordance with operations of the steering wheel. In this manner, steering is enabled without generating a sense of being tensioned in input torque.

The power steering apparatus according to the present invention is a power steering apparatus for applying steer-assisting force to a steering mechanism in accordance with operations of a steering means, the apparatus comprising a steering torque detector for detecting input torque that is applied to the steering means; a control value through hydraulic oil flows from a hydraulic pump that is driven by an electric motor, being located between the hydraulic pump and hydraulic cylinder for steer-assisting; and a controller setting the electric motor not to exceed predetermined revolutions when the input torque is equal to or smaller than a predetermined value and for performing control of revolutions of the electric motor in accordance with a steering angular velocity of the steering means when the input torque exceeds the predetermined value, wherein when the input torque is smaller than the predetermined value, the power steering apparatus constituted in that a pressure of the hydraulic oil to be supplied to the hydraulic cylinder comes to be not raised.

In the present invention, when the input torque is equal to or smaller than a predetermined value, the electric motor is suspended or performing stand-by operations at revolutions that does not exceed a predetermined value, and when the input torque has exceeded the predetermined value in the course of steering, the electric motor is driven or the revolutions of the electric motor is increased. When the input torque is equal to or smaller than the predetermined value, the pressure of hydraulic oil to be supplied from the control valve to the hydraulic cylinder is in a condition in which it is not raised so that the hydraulic force is not increased even though the electric motor drives. Such a condition can be realized by setting a spring coefficient of the connecting shaft such as the torsion bar and setting throttling degree of throttles of the control value. The spring coefficient is decided by setting a material, thickness and length for the connecting shaft. The throttling degree of throttles is decided by setting shape, interval and size for the throttles.

When the input torque has exceeded a final point of a condition in which the hydraulic force is not increased in the course of steering, by the electric motor which speed is already increased than that by the driving or the stand-by operation, hydraulic force can be continuously increased from the condition in which the hydraulic force is not raised, and steering can be performed in a smooth manner while generating no abrupt changes in hydraulic force at the time the electric motor is started driving at proper revolutions according to operations of the steering wheel. In this manner, steering is enabled without generating a sense of being tensioned in input torque.

The above and further objects and features of the invention will more fully be apparent from the following detailed description with accompanying drawings.

DETAILED DESCRIPTION OF THE INVENTION

The present invention will now be explained in details based on the drawings that show embodiments thereof.

Embodiment 1

Figure 3:
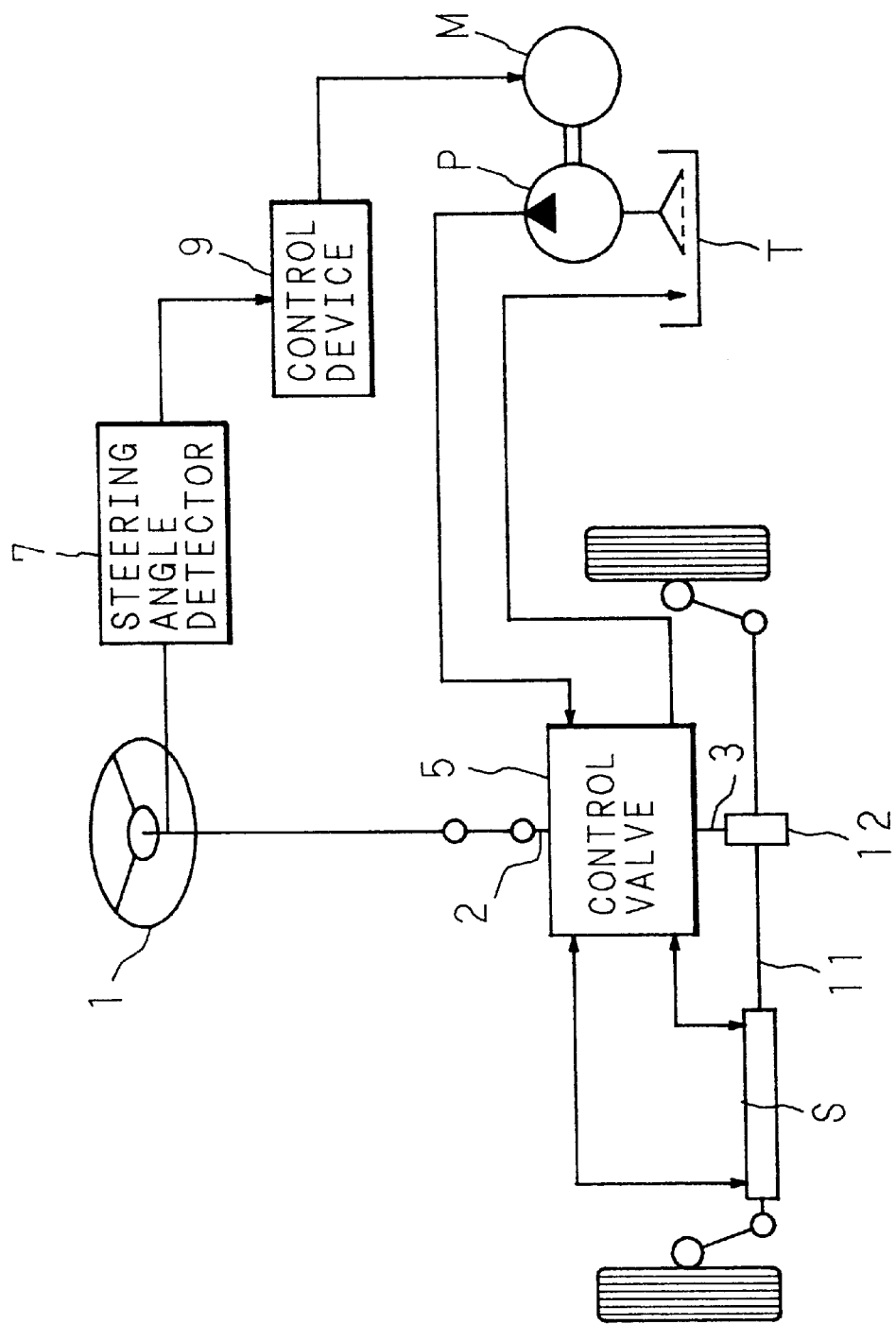
FIG. 3 is a schematic view of the power steering apparatus according to a first embodiment of the present invention.
Figure 4:
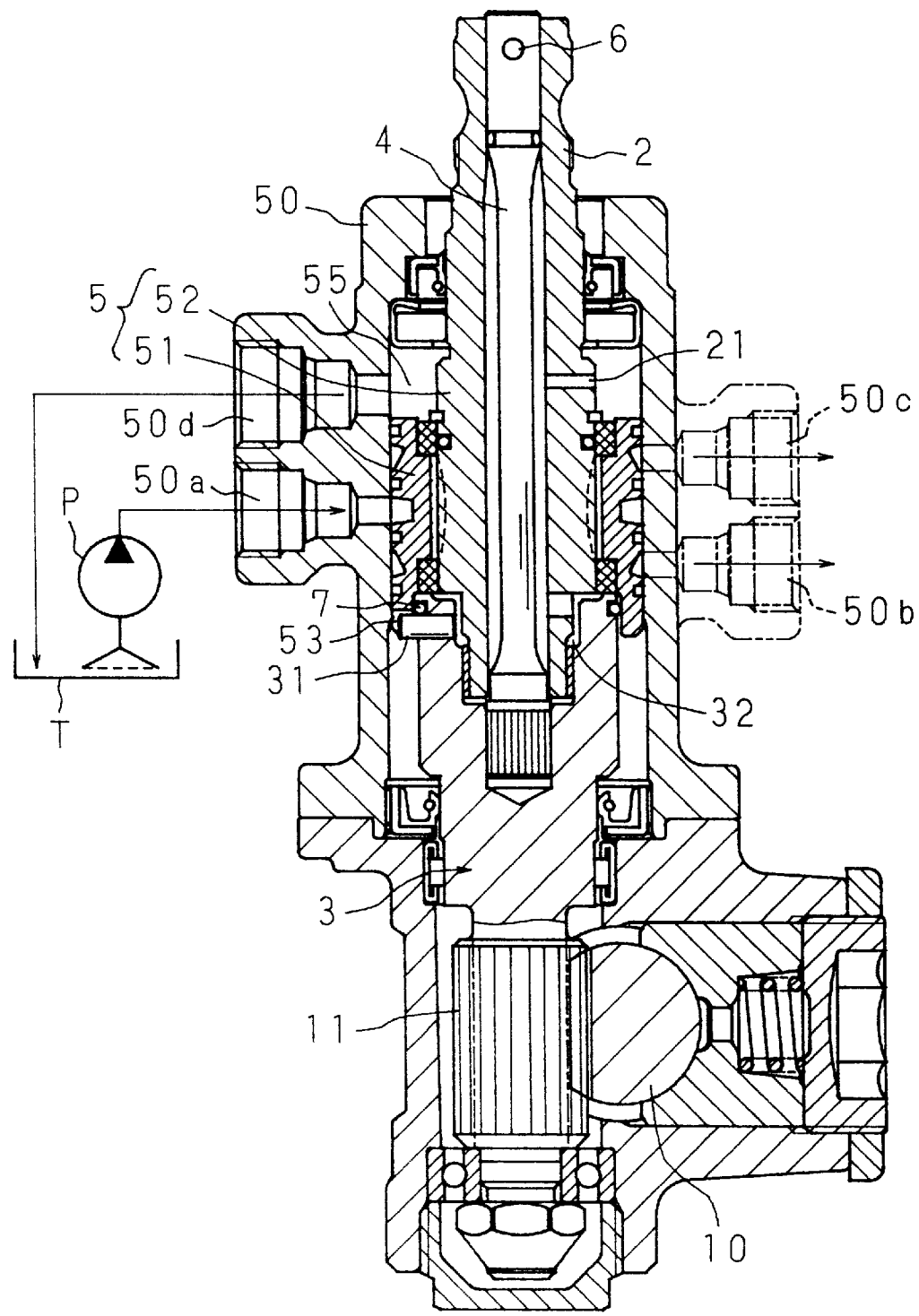
FIG. 4 is a vertical sectional view of a control valve of the power steering apparatus according to the present invention.
Figure 5:
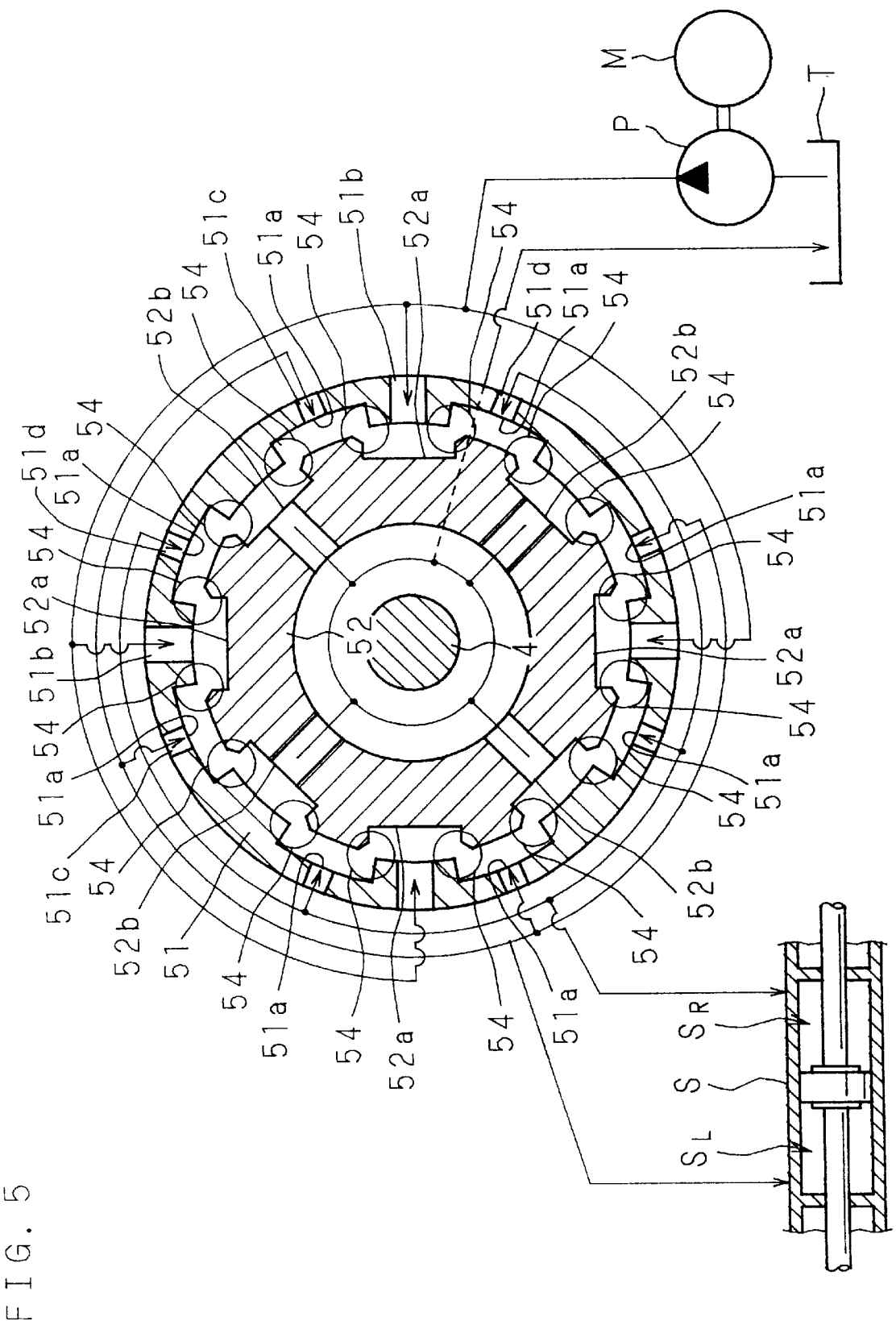
FIG. 5 is a schematic transverse cross sectional view of a control valve of the power steering apparatus according to the present invention.

FIG. 3 is a schematic view of the power steering apparatus, FIG. 4 is a longitudinal sectional view of a control valve of the power steering apparatus and FIG. 5 is a schematic transverse cross sectional view of a control valve of the power steering apparatus.

As shown in FIG. 3 and FIG. 4, the power steering apparatus comprises a hollow input shaft 2 that is connected to a steering wheel 1 that serves as a steering means for steering, an output shaft 3 that is connected to a steering mechanism and having a pinion 12 that is in mesh with an intermediate portion of a rack shaft 11 that is provided in a front portion of a vehicle body and extending in a lateral direction, a torsion bar 4 for coaxially connecting the input shaft 2 and the output shaft 3, a control valve 5 provided at the input shaft 2 and the output shaft 3 and comprising a valve body 51 and a valve spool 52 that are fitted to each other such that a relative angular displacement is generated in accordance with torsion in the torsion bar, a hydraulic cylinder S for steer-assisting that is arranged intermediate of the rack shaft 11, a hydraulic pump P for supplying hydraulic oil to the hydraulic cylinder S and that is driven by an electric motor M, and an oil tank T that serves as a destination of drained oil. Through actions of the control valve 5 according to operations of the steering wheel 1 as will be described later, it is achieved for an arrangement wherein hydraulic pressure generated at the hydraulic pump P is supplied from the control valve 5 to the hydraulic cylinder S while returning oil from the hydraulic cylinder S is drained to the oil tank T. Hydraulic force (steer-assisting force) that is generated by the hydraulic cylinder S upon supply of hydraulic pressure is applied to the rack shaft 11 so as to assist sliding movement of the rack shaft 11.

The input shaft 2 and output shaft 3 are respectively supported in that they are rotatable within a cylindrical valve housing 50 in a coaxial direction. A fitting concave portion 32 is formed at one end portion of the output shaft 3, and to the fitting concave portion 32, there is supported one end portion of the input shaft 2 through fitting in a rotatable manner, and one end portion of the torsion bar 4 through spline fitting. The other end portion of the torsion bar 4 is connected to the other end portion of the input shaft 2 by means of a knock pin 6.

The control valve 5 comprises, as shown in FIG. 5, of a cylindrical valve body 51 that is supported through fitting within the valve housing 50 in a rotatable manner and that rotates in a same direction as the output shaft 3, and a valve spool 52 that is inserted inside of the valve body 51 such that relative angular displacement is enabled in a freely manner and that is integrally formed at an intermediate portion of an outer circumference of the input shaft 2.

The output shaft 3 and the valve body 51 are arranged in that they may be rotated in the same direction through engagement between an engaging concave portion 53 of the valve body 51 that is concave from one end towards another end and a rotation restraining pin 31 that is provided as to project from one end of the output shaft 3 to outside in a diametric direction.

An inner peripheral surface of the valve body 51 and an outer peripheral surface of the valve spool 52 are provided with a plurality of oil grooves 51a, 52a and 52b that are aligned at substantially equal intervals in a peripheral direction, each oil grooves extending in a longitudinal axial direction as shown in FIG. 5. These oil grooves are arranged in zigzag positions in a peripheral direction on the fitting periphery, and a plurality of throttles 54 are respectively formed between adjoining oil grooves 51a and 52a and between oil proves 51a and 52b, each throttle 54 having throttle area that is variable in accordance with the relative angular displacement. It should be noted that in this embodiment, chamfered portions are formed at edges on both ends of respective land portions that are formed between respective oil grooves 52a and 52b of the valve spool 52, and opposing spaces formed between these chamfered portions and each of the edges of the oil grooves 51a of the valve body 51 are defined to be the throttles 54.

The hydraulic pump P that serves as an oil supply source is attached to be communicated to the oil grooves 52a (oil supply groove) via a pump port 50a for connecting the interior and exterior of the valve housing 50 and an oil supply hole 51b that pierce through the valve body 51, and the oil grooves 51a (oil distribution grooves) adjoining both sides of the oil grooves 52a are respectively communicated to both cylinder chambers $S_L$, $S_R$ of the hydraulic cylinder S that serves as a destination of transferred oil via oil transfer holes 51c and 51d piercing through the valve body 51 and cylinder ports 50b, 50c, respectively, that pierce through the valve housing 50 between the interior and exterior. Further, the oil grooves 52b (oil drain grooves) adjoining the other sides of the distribution grooves 51a are communicated to an oil drain chamber 55 that is formed at one side of the valve body 51 via the hollow portion of the input shaft 2, and is communicated to the oil tank T that serves as a destination for drained oil via a tank port 50d for piercing through the valve housing 50 at a corresponding position of the oil drain chamber 55 between the interior and exterior.

The plurality of throttles 54 that are aligned on the fitting periphery formed by the valve body 51 and the valve spool 52 are adjusted to be at a neutral point to respectively assume equal throttle areas in a neutral condition in which no torsion are generated in the torsion bar 4. At the neutral point, hydraulic oil that is supplied from the hydraulic pump P via the pump port 50a to the oil supply grooves 52a is equally introduced to the adjoining distribution grooves 51a on both sides thereof, then introduced to the oil drain grooves 52d adjoining the other thereof, and thereafter drained to the oil tank T by passing through the hollow portion of the input shaft 2, a communication hole 21, the oil drain chamber 55 and the tank port 50d. At this time, no pressure differences are caused in the cylinder chambers $S_L$ and $S_R$ that are respectively communicated to the distribution grooves 51a so that no force is generated by the hydraulic cylinder S.

On the other hand, in case input torque (steering torque) is applied to the steering wheel 1 for steering, a relative angular displacement in a direction of the input torque is generated accompanying torsion in the torsion bar 4 between the input shaft 2 and the output shaft 3, that is, between the valve spool 52 and the valve body 51, whereupon throttle areas of the throttles 54 that are aligned on the fitting periphery of these members are varied. At this time, hydraulic oil that is supplied to the oil supply grooves 52a is mainly introduced to one of the distribution grooves 51a through the throttles with increased throttle areas so that a pressure difference is generated between one cylinder chamber $S_L$ (or $S_R$) that is communicated to the distribution groove 51a via the cylinder port and the other cylinder chamber $S_R$ (or $S_L$) that is communicated to the other distribution groove 51a via the cylinder port whereby the power cylinder S generates hydraulic force according to this pressure difference.

At this time, hydraulic oil is pushed out from the other cylinder chamber $S_R$ (or $S_L$), returned to the other distribution groove 51a via the corresponding cylinder port, introduced to the oil drain groove 52b through throttles on one side of the distribution grooves 51a with increased throttle areas, and then drained to the oil tank T by passing through the hollow portion of the input shaft 2, oil drain chamber 55, and the tank port 50d.

The power steering apparatus of the above arrangement is further comprising, as shown in FIG. 3, with a steering angle detector 7 for detecting a steering angle of the steering wheel 1 and a control device 9 such as microprocessor for calculating a steering angular velocity of the steering wheel 1 based on the steering angle that has been detected by the steering angle detector 7, for setting the electric motor M not to exceed predetermined revolutions when the steering angle is equal to or smaller than a predetermined value θ and for performing control of revolutions of the electric motor M in accordance with the steering angular velocity of the steering wheel 1 when the steering angle has exceeded the predetermined value θ.

Figure 6:
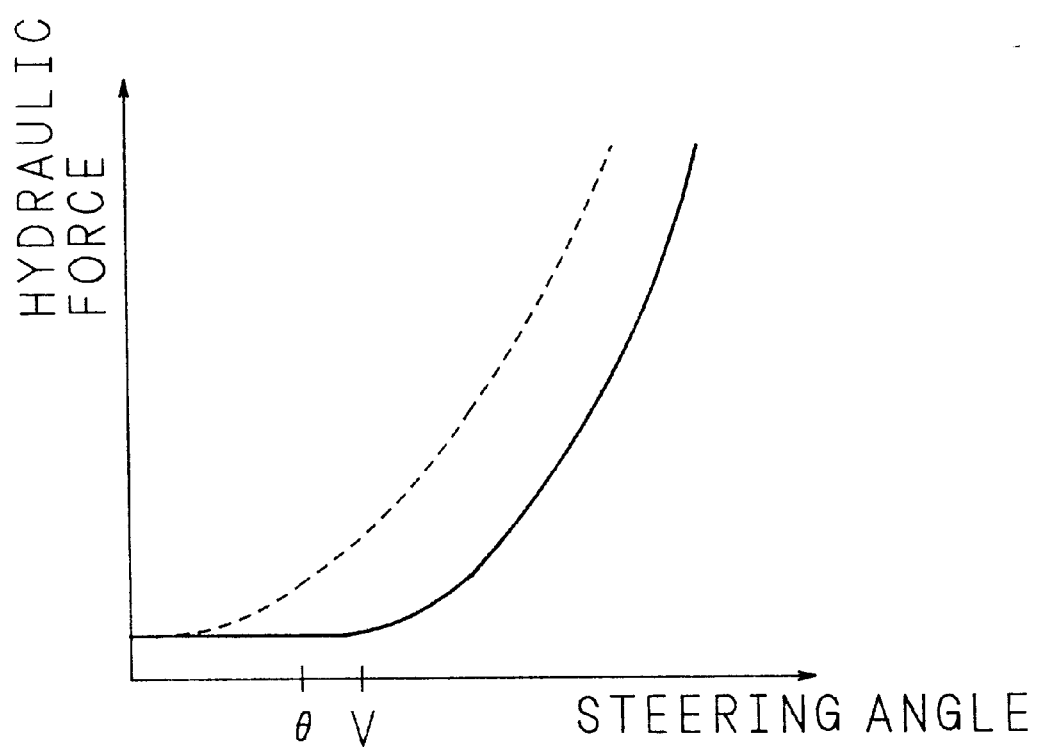
FIG. 6 is a hydraulic characteristics view showing a relationship between steering angle and hydraulic force of the power steering apparatus according to the first embodiment of the present invention.

FIG. 6 is a hydraulic characteristics view of the power steering apparatus of the present invention showing a relationship between the steering angle and hydraulic force that is controlled by the control valve. The longitudinal axis represents hydraulic force and the lateral axis represents steering angle. In the graph, the solid line represents characteristics of the apparatus of the first embodiment and the broken line represents characteristics of a prior art apparatus. The control device 9 controls the hydraulic pump P to assume high flow rate from low flow rate by performing control of driving or suspending the electric motor M based on a detected value that has been detected by the steering angle detector 7, by obtaining a steering angular velocity of the steering wheel 1 based on the detected value that has been detected by the steering angle detector 7, and by performing control of revolutions of the electric motor M based on the steering angular velocity. The apparatus is arranged, as shown in FIG. 6, in that the pressure of hydraulic oil to be supplied to the hydraulic cylinder S is in a condition in which it does not rise when the steering angle that has been detected by the steering angle detector 7 is equal to or smaller than the predetermined value θ. It should be noted that the apparatus may also be arranged in that the steering angular velocity of the steering wheel 1 is detected by a steering angular velocity detector and the detected steering angular velocity is inputted to the controller 9.

In order to realize a condition in which the pressure of hydraulic oil to be supplied to the hydraulic cylinder S is not raised when the steering angle is equal to or smaller than the predetermined value θ, throttles 54 that are disposed between the oil grooves 51a and 52a of the valve body 51 and the valve spool 52 of the control valve 5 (see FIG. 5) are formed so that the hydraulic force is not raised even though the hydraulic pump P is driven in a range in which the steering angle is between the neutral condition until the predetermined value θ is reached. Concretely, the degree for throttling the throttles 54 up to the predetermined value and a spring coefficient k of the torsion bar 4 are set. This is because the input torgue applied to the steering wheel 1 is decided by the product of the spring coefficient k of the torsion bar 4 and the steering angle. The steering angle means a rotating angle between the input shaft 2 and the output shaft 3. The throttling degree for the throttles 54 is decided by setting shape, interval and size for the throttles 54. Alternatively, the spring coefficient is decided by setting material, thickness and length for the torsion bar 4.

In this manner, the control value is constituted in which hydraulic force can be continuously increased from a condition in which the hydraulic force is not being raised when steering is performed in which the predetermined value θ for the steering angle has been exceeded.

Control of the electric motor M is performed as follows. In case the steering angle θ with respect to the neutral condition is set to be e.g. 3° with which the electric motor M is not frequently driven, no detecting signal is output from the steering angle detector 7 until the steering angle reaches 3° so that manual steering is performed without driving the electric motor M. When the predetermined value θ (3°) has been exceeded accompanying the steering, a detecting signal is output from the steering angle detector 7 to drive the electric motor M based on a signal output from the control device 9, a steering angular velocity is calculated in the control device 9, and control of revolutions is performed based on a signal that is output from the control device 9.

Figure 7:
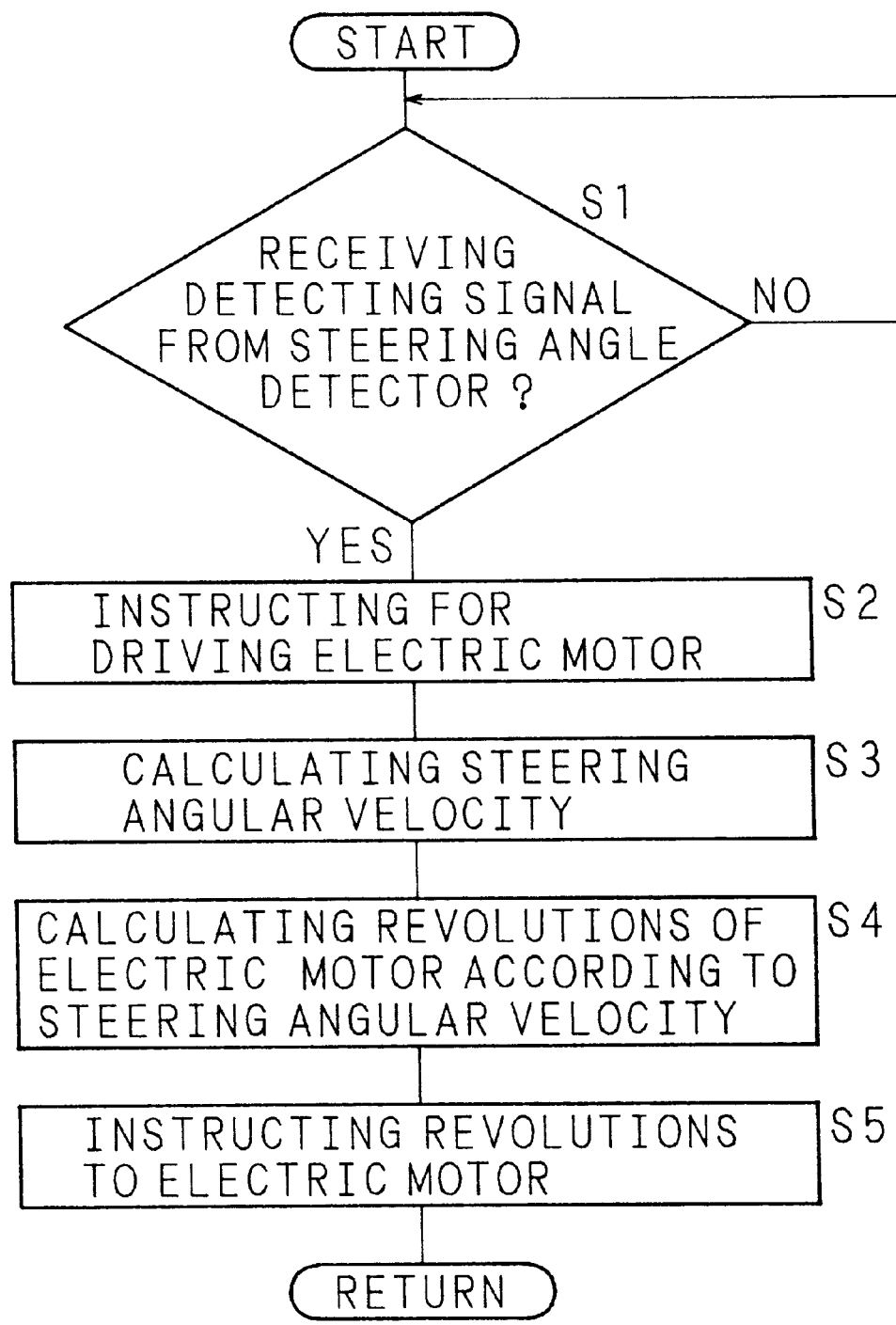
FIG. 7 is a flow chart showing sequences of a control device during steer-assisting processes of the power steering apparatus according to a first embodiment.

FIG. 7 is a flow chart for showing sequences of the control device 9 during steer-assisting processes.

Steer assisting of the steering wheel 1 is performed as follows. The steering angle detector 7 outputs a detecting signal to the control device 9 at a point at which a predetermined value θ, e.g. 3°, for the steering angle is detected. When the steering angle is equal to or smaller than 3°, steering is performed manually without driving the electric motor M. When the steering angle has exceeded 3° in the course of steering, a detecting signal from the steering angle detector 7 is recived (Step S1), and an instruction for driving the electric motor M is given (Step S2). Upon instructions of the control device 9, the electric motor M is started driving and hydraulic oil is supplied from the hydraulic pump P to the control valve 5. As already mentioned, since the control valve 5 is in a condition in which hydraulic force is not raised when the steering angle is equal to or smaller than the predetermined value θ, it can be prevented that hydraulic force is abruptly raised by hydraulic oil to be supplied from the hydraulic pump P that is already in a driving state when the steering angle has exceeded a final point V (see FIG. 6) for the condition in which hydraulic force is not raised in the course of steering.

The control device 9 calculates a steering angular velocity based on a detecting signal from the steering angle detector 7 (Step S3). Thereafter, revolutions for the electric motor according to the steering angular velocity is calculated (Step S4), and control of the drive of the electric motor M is performed based on the obtained revolutions (Step S5). Consequently, steer-assisting force corresponding to the steering angular velocity can be obtained.

It should be noted that the final point V for the condition in which the pressure of hydraulic force is not raised is made to be approximate exceeding a point which corresponds to the predetermined value θ, whereby steer-assisting force can be rapidly generated at a favorable steering angle θ of approximately 3°. The predetermined value θ for the steering angle is not limited to 3°, and similar effects can be achieved by setting a condition in which the pressure of hydraulic oil is not raised in accordance with a desired steering angle.

Embodiment 2

Figure 8:
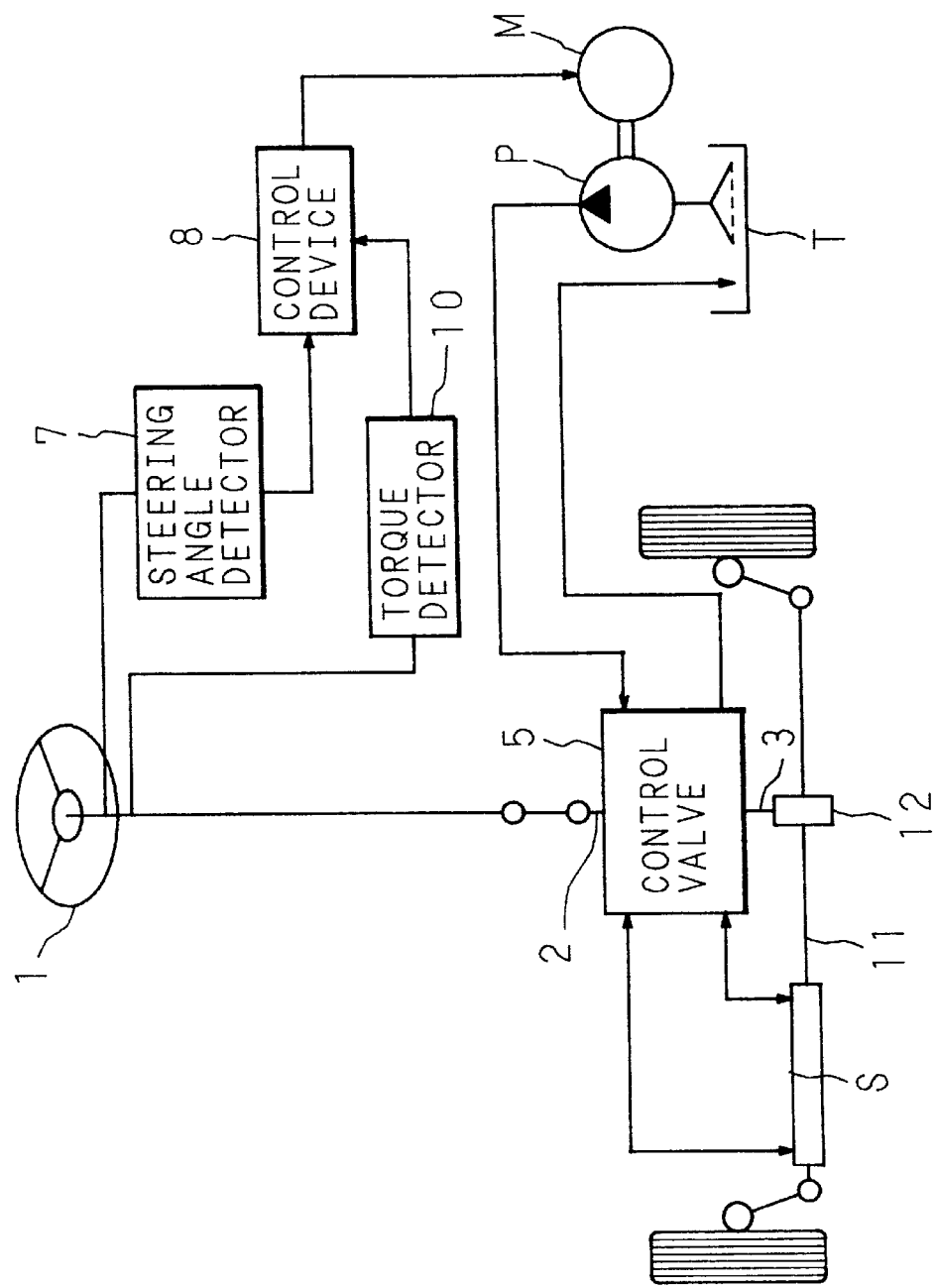
FIG. 8 is a schematic view of the power steering apparatus according to a second embodiment of the present invention.

FIG. 8 is a schematic diagram of the power steering apparatus according to a second embodiment. The power steering apparatus according to the second embodiment utilizes a torque detector 10 for detecting input torque that is applied to a steering wheel 1, a steering angle detector 7 for detecting a steering angle of the steering wheel 1, and a control device 8 such as a microprocessor, for setting an electric motor M not to exceed predetermined revolutions when the input torque is equal to or smaller than a predetermined value T0 and for performing control of revolutions of the electric motor M in accordance with a steering angular velocity of the steering wheel 1, the steering angular velocity being obtained by the detected steering angle, when the input torque has exceeded the predetermined value T0, wherein the control device 8 controls the hydraulic pump P to assume high flow rate from low flow rate by performing control of driving or suspending the electric motor M based on a detected value that has been detected by the torque detector 10 and by performing control of revolutions of the electric motor M based on the obtained steering angular velocity. The apparatus is arranged in that the pressure of hydraulic oil to be supplied to a hydraulic cylinder S is in a condition in which it is not raised when the input torque that has been detected by the torque detector 10 is equal to or smaller than the predetermined value T0. Due to the fact that arrangements and actions of this embodiment are similar to those of the previous Embodiment 1 except for the points that driving and suspension of the electric motor M is performed by using the torque detector 10 rather than the steering angle detector 7 for the steering angle, identical reference numerals are used and detailed explanations thereof and descriptions related to arrangements and actions thereof will be omitted here. It should be noted that the apparatus may also be arranged in that the steering angular velocity of the steering wheel 1 is detected by a steering angular velocity detector and the detected steering angular velocity is inputted to the controller 8.

Figure 9:
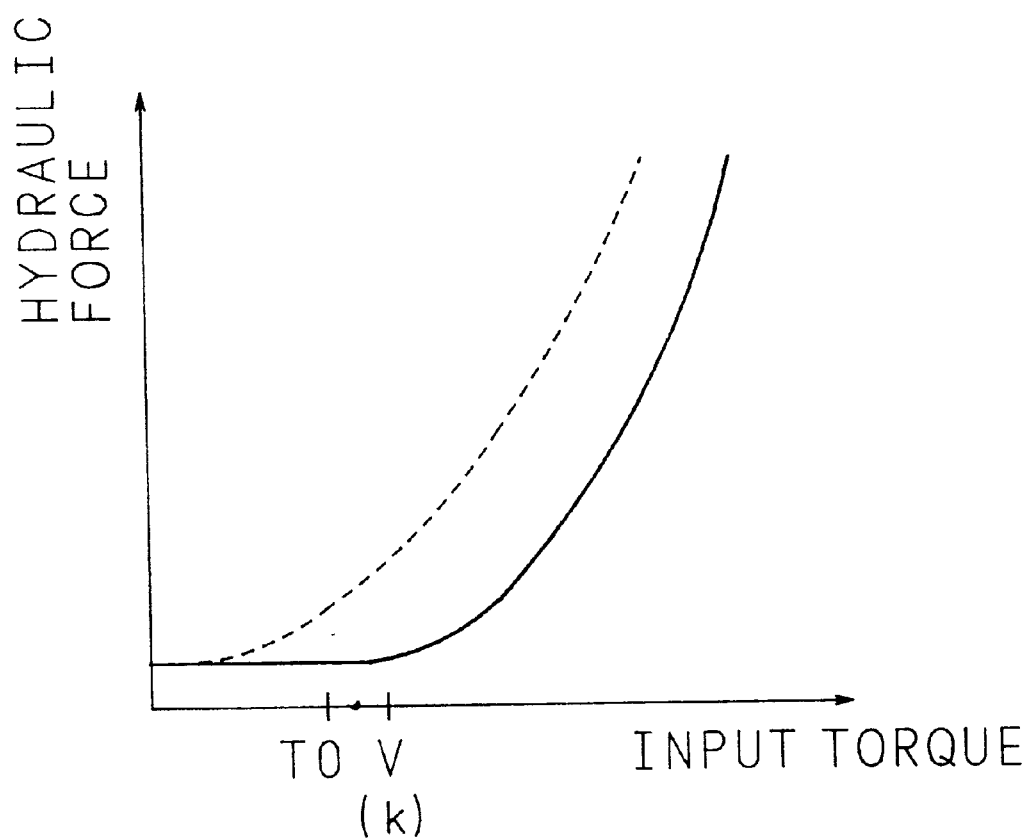
FIG. 9 is a hydraulic characteristics view showing a relationship between input torque and hydraulic force of the power steering apparatus according to the second embodiment of the present invention.

FIG. 9 is a hydraulic characteristics view showing a relationship between input torque that is applied to the steering wheel and hydraulic force that is controlled by the control valve. The longitudinal axis represents hydraulic force and the lateral axis represents input torque. In the graph, the solid line represents characteristics of the apparatus of the second embodiment and the broken line represents characteristics of a prior art apparatus. In FIG. 9, T0 denotes a predetermined value for the input torque, and V a final point for a condition in which hydraulic force is not increased.

In order to realize a condition in which the pressure of hydraulic oil that is supplied to the hydraulic cylinder S is not raised, when the input torque to be applied to the steering wheel 1 is equal to or smaller than the predetermined value T0, it is necessary to set throttles 54 of the control valve 5 and to set the spring efficient k for the torsion bar 4. The input torgue is decided by a product of the spring efficient k for the torsion bar 4 and a steeling angle of the steering wheel 1. For this reason, the throttles 54 and the spring efficient k are set so that the hydraulic force is not raised when the hydraulic pump P driven in a range in which the input torgue is between the zero condition until the predetermined value T0 is reached. The throttles 54 can be desided by setting shape, clearance and size thereof.

Then, the spring coefficient k can be decided by setting a material, thickness and length for the torsion bar 4. In this manner, the control value is constituted in which hydraulic force can be continuously increased from a condition in which the hydraulic force is not being raised when steering is performed in which the predetermined value T0 for the input torgue has been exceeded.

Control of the electric motor M is performed as follows. In case the input torque in a range from a suspended condition of the steering wheel to the predetermined value T0 is set to be an input torque 2N·m with which the electric motor M is not frequently driven, no detecting signal is output from the torque detector 10 until the input torque 2N·m is obtained so that manual steering is performed without driving the electric motor M. When it has been reached an input torque that has exceeded 2N·m in the course of steering, a detecting signal is output from the torque detector 10, so as to drive the electric motor M based on a signal output from the control device 8, a detecting signal is output from the steering angle detector 7, and control of revolutions is performed based on a signal corresponding to a result that is output by the control device 8.

Figure 10:
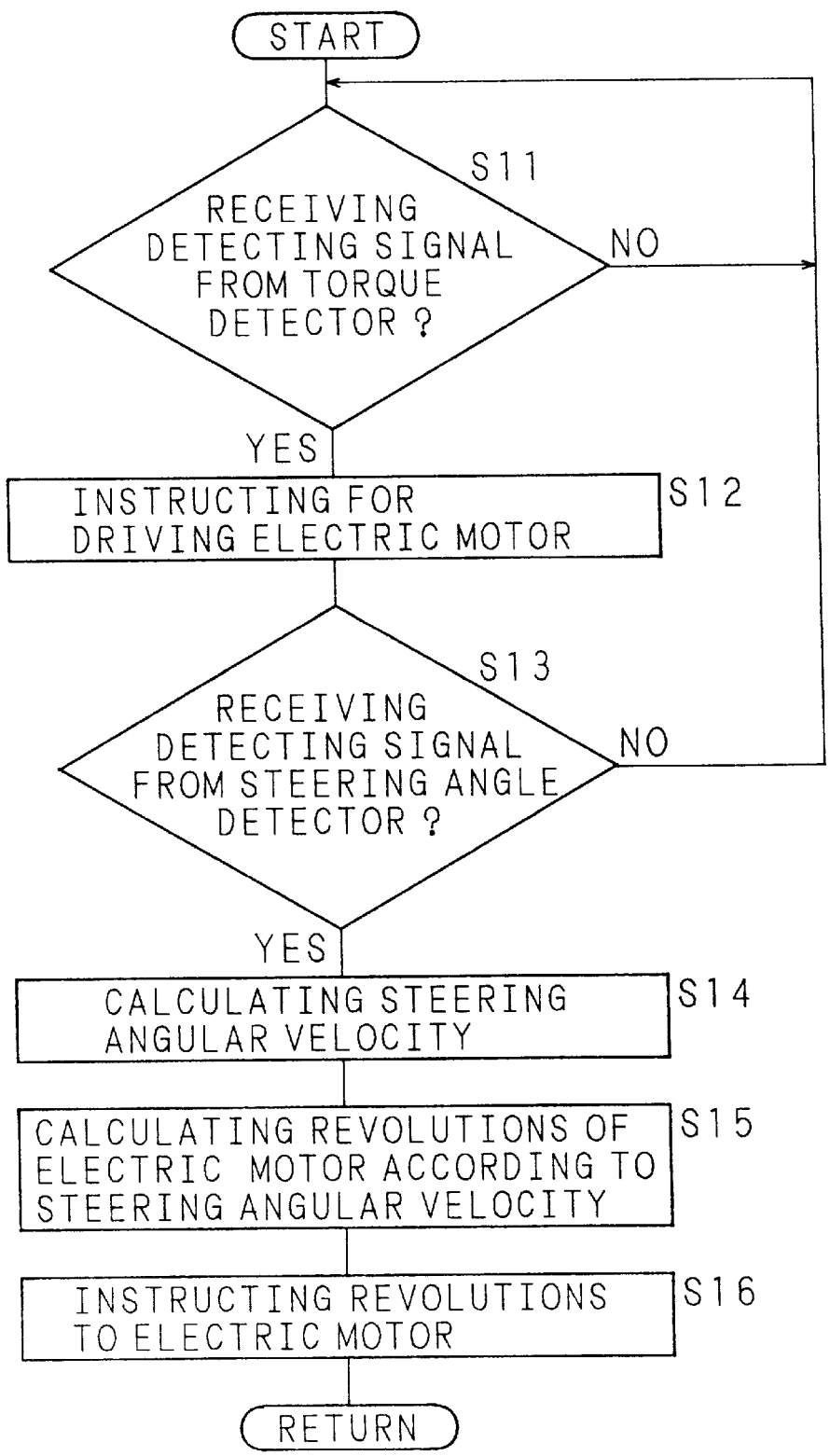
FIG. 10 is a flow chart showing sequences of a control device during steer-assisting processes of the power steering apparatus according to the second embodiment.

FIG. 10 is a flow chart for showing sequences of the control device 8 during steer-assisting processes.

Steer assisting is performed in the following manner in the Embodiment 2. The torque detector outputs a detecting signal to the control device 8 at a point at which a predetermined value T0, e.g. 2N·m, for the input torque that is applied to the steering wheel 1 is detected. When the input torque is equal to or smaller than 2N·m, steering is performed manually without driving the electric motor M. When the input torque exceeded 2N·m in the course of steering, a detecting signal from the torque detector 10 is received (Step S11), and an instruction for driving the electric motor M is given (Step S12). Upon instructions of the control device 8, the electric motor M is driven and hydraulic oil is supplied from the hydraulic pump P to the control valve 5. As already mentioned, since the control valve 5 is in a condition in which hydraulic force is not raised when the input torque is equal to or smaller than the predetermined value T0, it can be prevented that hydraulic force is abruptly raised by hydraulic oil that is supplied from the hydraulic pump P that is already in a driving state when the input torque exceeded the final point V (see FIG. 9) provided by the spring coefficient k of the torsion bar 4 in the course of steering.

The steering angle detector 7 outputs a detecting signal to the control device 8 and calculates the angular velocity when the input torque has exceeded the steering angle corresponding to 2N·m. The control device 8 receives the detecting signal from the steering angle detector 7 (Step S13) and calculates a steering angular velocity in the course of steering (Step S14). Then, revolutions for the electric motor according to the steering angular velocity is calculated (Step S15), and control of the drive of the electric motor M is performed based on the obtained revolutions (Step S16). Consequently, steer-assisting force corresponding to the steering angular velocity can be obtained.

It should be noted that the final point V for the condition in which the pressure of hydraulic force is not raised is made to be approximate exceeding a point that corresponds to the predetermined value T0.

Figure 11:
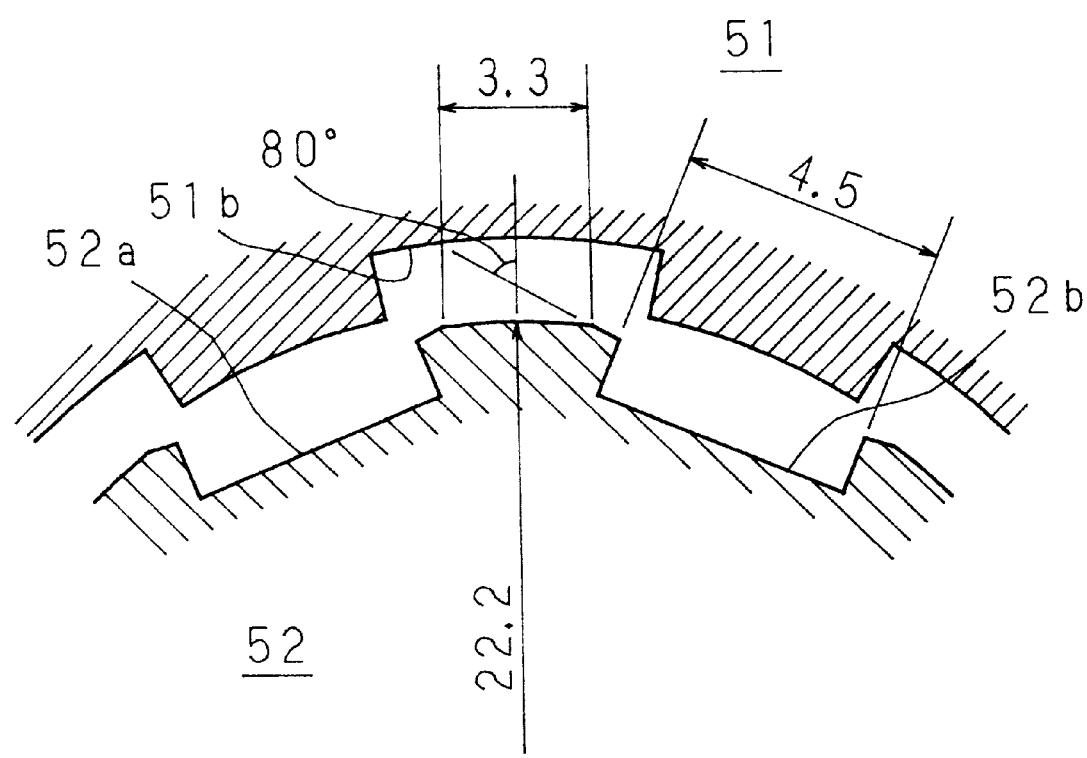
FIG. 11 is an explanatory view showing a concrete example of the second embodiment.

A concrete example of Embodiment 2 will now be explained. FIG. 11 is an explanatory view showing dimensions of the valve body 51 and the valve spool 52 of the control valve 5 (see FIG. 5) and an angle of chamfered portions. As shown in FIG. 11, an outer diameter of a land portion of the valve spool 52 has a radius of 22.2 mm, and a width of the oil grooves 52 and 52b is 4.5 mm, respectively. The chamfered portions are formed on edges on both ends of the respective land portions that is formed between the oil grooves 52a and 52b of the valve spool 52 with a center of 3.3 mm remaining and are cut off in a direction to form an angle of 80° with respect to a radial line that passes through the center of the land portion. Further, there is a gap between an inner peripheral surface of the valve body 51 and an outer peripheral surface of the value spool 52. The spring coefficient of the torsion bar 4 is 1.3 (N·m/deg).

Figure 1:
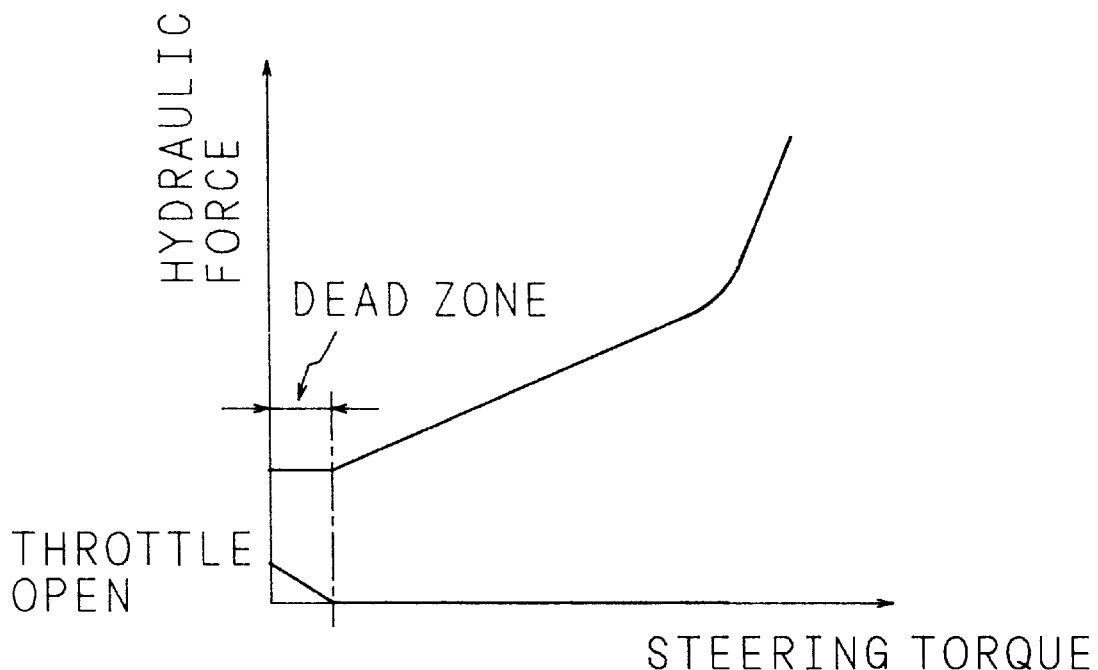
FIG. 1 is a characteristics view of open of throttles and hydraulic force with respect to steering torque in a power steering apparatus according to a prior art.
Figure 2:
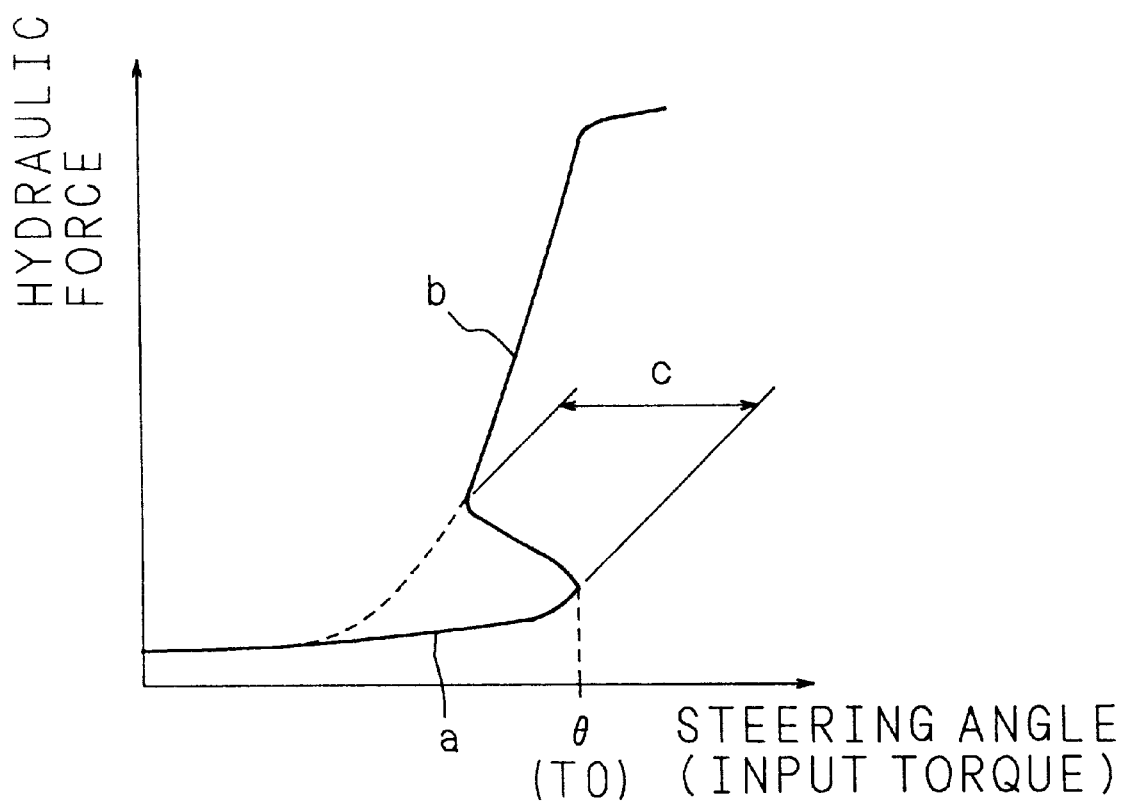
FIG. 2 is a characteristics view showing a relationship between input torque that is applied a steering wheel and hydraulic force according to the prior art.
Figure 12:
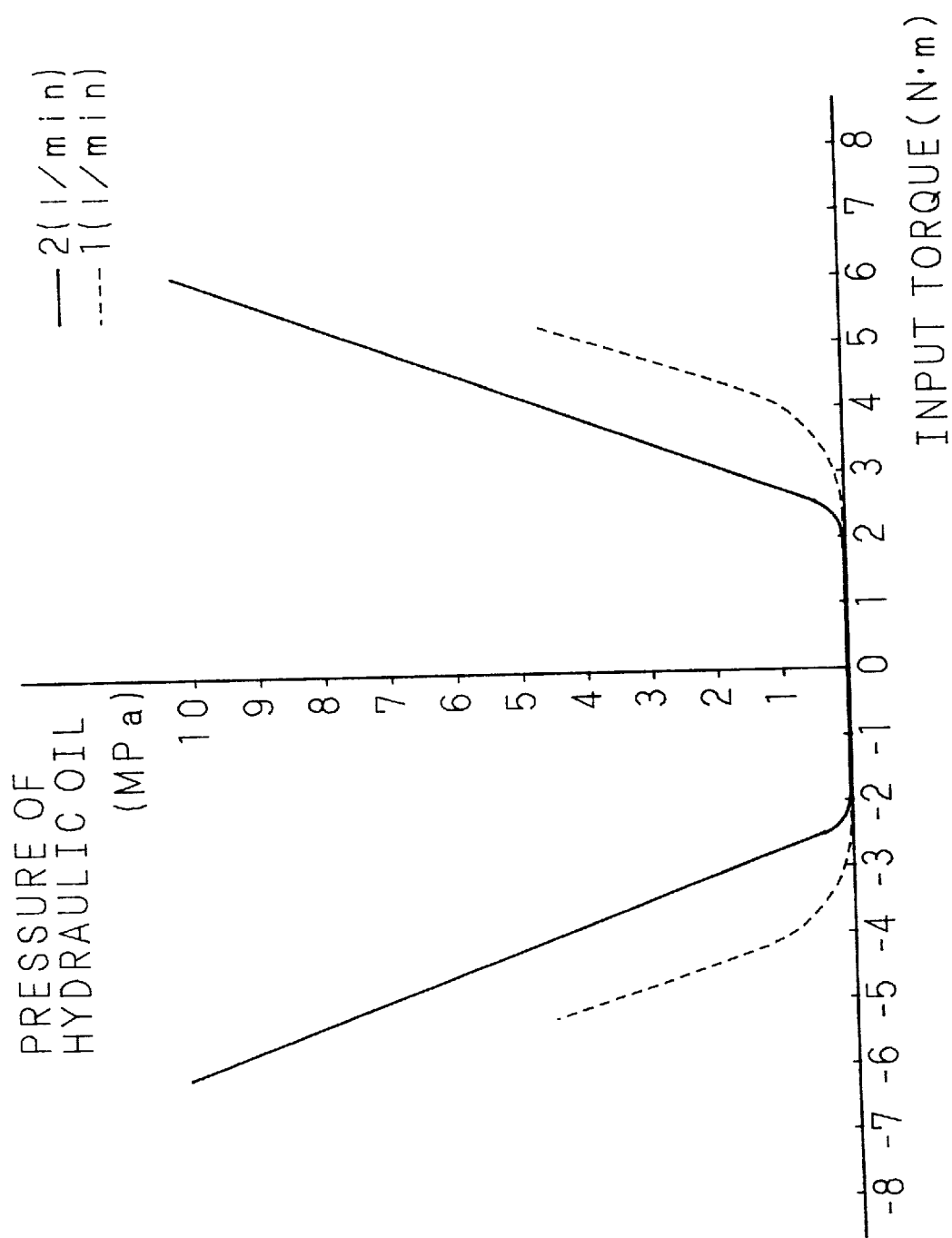
FIG. 12 is a graph showing a relationship between input torque and hydraulic force of the concrete example.

Utilizing a power steering apparatus of the above arrangement, a relationship between input torque that is applied to the steering wheel and hydraulic pressure that is controlled by the control valve has been examined. FIG. 12 is a graph showing valve characteristics wherein a flow rate for the drained hydraulic oil is 1.0 l/min during the electric motor M is driven at revolutions that is equal to or smaller than a predetermined value (represents at broken line), and a flow rate for the drained hydraulic oil is 2.0 l/min when the input torque has exceeded the predetermined value T0 (represents at solid line). The longitudinal axis represents pressure of hydraulic oil and the lateral axis represents input torque. As it can be understood from the graph, after the input torque has exceeded the predetermined value of 2N/m, the valve characteristics sifts from that at the flow rate of 1.0 l/min toward that at the flow rate of 2.0 l/min, as a result, the hydraulic pressure gradually rises accompanying the increase in put torgue. It can be understood that no phenomena are caused in which input torque is decreased accompanying the increase in hydraulic pressure which was the case with conventional apparatuses (see FIG. 2). In this manner, the power steering apparatus is formed such that the hydraulic force is not raised when the hydraulic pump P is driven in a period in which the steering wheel 1 is in a stop condition up to a condition in which the predetermined input torque T0 is reached. Thus, steering can be performed without feeling a sense of being torn in the input torque.

It should be noted that the above-explained embodiments 1 and 2 were arranged in that driving of the electric motor M is suspended when values are equal to or smaller than the predetermined value θ for the steering angle or than the predetermined value T0 for the input torque, and in that control of revolutions of the electric motor M in accordance with the steering angular velocity of the steering wheel 1 is performed when the steering angle has exceeded the predetermined value θ or the input torque has exceeded the predetermined value T0. Alternatively, it is possible to employ an arrangement to perform stand-by operations of the electric motor M at revolutions that is equal to or smaller than a predetermined value when the steering angle are not exceed the predetermined value θ or the input torgue are not exceed the predetermined value T0, and in that the electric motor M is increased in speed in accordance with the steering angular velocity of the steering wheel 1 when the steering angle exceeded the predetermined value θ or the input torque exceeded the predetermined value T0.

According to the present invention that has been explained above in details, when the steering angle is equal to or smaller than a predetermined value, the electric motor suspends or performs stand-by operations at revolutions that is equal to or smaller than a predetermined value, and at the point that the steering angle has exceeded the predetermined value in the course of steering, the electric motor drives or it starts that the revolutions of the electric motor is increased. When the steering angle is equal to or smaller than the predetermined value, the pressure of hydraulic oil that is supplied from the control valve to the hydraulic cylinder is in a condition in which it is not raised so that the hydraulic force is not increased. When the steering angle has exceeded the final point of a condition in which the hydraulic force is not increased in the course of steering, hydraulic force can be continuously increased from the condition in which the hydraulic force is not raised by the electric motor which speed is already increased by the driving or the stand-by operation, and it can be prevented that abrupt changes in hydraulic force are caused. In this manner, steering is enabled without generating a sense of being tensioned in input torque.

Further, according to the present invention, when the input torque is equal to or smaller than a predetermined value, the electric motor is in a condition in which it is in a stand-by operation or in which its driving is suspended at revolutions that is equal to or smaller than a predetermined value, and when the input torque has exceeded the predetermined value in the course of steering, the electric motor is driven or the revolutions of the electric motor is increased. When the input torque is equal to or smaller than the predetermined value, the pressure of hydraulic oil that is supplied from the control valve to the hydraulic cylinder is in a condition in which it is not increased so that the hydraulic force is not increased. In case the input torque has exceeded a final point of a condition in which the hydraulic force is not increased in the course of steering, hydraulic force can be continuously increased from the condition in which the hydraulic force is not raised by the electric motor which speed is already increased by the driving or the stand-by operation, and it can be prevented that abrupt changes in hydraulic force are caused. In this manner, steering is enabled without generating a sense of being tensioned in input torque.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalences of such metes and bounds are therefore intended to be embraced by the claims.

What is claimed is:

1. A power steering apparatus for applying steer-assisting force to a steering mechanism in accordance with operations of a steering means, comprising:
    a steering angle detector for detecting a steering angle of the steering means;
    a control valve for which a hydraulic oil flows from a hydraulic pump that is driven by an electric motor, being located between the hydraulic pump and hydraulic cylinder for steer-assisting;
    a controller for setting the electric motor not to exceed predetermined revolutions when the detected steering angle is smaller than a predetermined value, and for performing control of revolutions of the electric motor in accordance with a steering angular velocity of the steering means when the steering angle exceeds the predetermined value,
    wherein when the steering angle is smaller than the predetermined value, a pressure of the hydraulic oil to be supplied to the hydraulic cylinder is not raised; and
    a connecting shaft for connecting the steering means and the steering mechanism, wherein a spring coefficient of the shaft is set to be a value in which the pressure of the hydraulic oil to be supplied to the hydraulic cylinder is not raised when the steering angle is smaller than the predetermined value.

2. The power steering apparatus according to claim 1, wherein the predetermined value for the steering angle is 3°.

3. A power steering apparatus for applying steer-assisting force to a steering mechanism in accordance with operations of a steering means, comprising:
    a steering angle detector for detecting a steering angle of the steering means;
    a control valve for which a hydraulic oil flows from a hydraulic pump that is driven by an electric motor, being located between the hydraulic pump and hydraulic cylinder for steer-assisting;
    a controller for setting the electric motor not to exceed predetermined revolutions when the detected steering angle is smaller than a predetermined value, and for performing control of revolutions of the electric motor in accordance with a steering angular velocity of the steering means when the steering angle exceeds the predetermined value,
    wherein the controller obtains a steering angular velocity of the steering means by using the steering angle detected by the steering angle detector,
    wherein when the steering angle is smaller than the predetermined value, a pressure of the hydraulic oil to be supplied to the hydraulic cylinder is not raised; and
    a connecting shaft for connecting the steering means and the steering mechanism, wherein a spring coefficient of the shaft is set to be a value in which the pressure of the hydraulic oil to be supplied to the hydraulic cylinder is not raised when the steering angle is smaller than the predetermined value.

4. The power steering apparatus according to claim 3, wherein the predetermined value for the steering angle is 3°.

5. A power steering apparatus for applying steer-assisting force to a steering mechanism in accordance with operations of a steering means, comprising:
    a steering angle detector for detecting a steering angle of the steering means;
    a control valve for which hydraulic oil flows from a hydraulic pump that is driven by an electric motor, being located between the hydraulic pump and hydraulic cylinder for steer-assisting, wherein the control valve is provided with throttles at flow passages for the hydraulic oil, each throttle having a throttle degree to which the pressure of the hydraulic oil to be supplied to the hydraulic cylinder is not raised when the steering angle is smaller than the predetermined value;
    a controller for setting the electric motor not to exceed predetermined revolutions when the detected steering angle is smaller than a predetermined value, and for performing control of revolutions of the electric motor in accordance with a steering angular velocity of the steering means when the steering angle exceeds the predetermined value,
    wherein when the steering angle is smaller than the predetermined value, a pressure of the hydraulic oil to be supplied to the hydraulic cylinder is not raised; and
    a connecting shaft for connecting the steering means and the steering mechanism, wherein a spring coefficient of the shaft is set to be a value in which the pressure of the hydraulic oil to be supplied to the hydraulic cylinder is not raised when the steering angle is smaller than the predetermined value.

6. The power steering apparatus according to claim 5, wherein the predetermined value for the steering angle is 3°.

7. A power steering apparatus for applying steer-assisting force to a steering mechanism in accordance with operations of a steering means, comprising:
    a steering angle detector for detecting a steering angle of the steering means;
    a control valve for which a hydraulic oil flows from a hydraulic pump that is driven by an electric motor, being located between the hydraulic pump and hydraulic cylinder for steer-assisting, the control valve is provided with throttles at flow passages for the hydraulic oil, each throttle having a throttle degree to which the pressure of the hydraulic oil to be supplied to the hydraulic cylinder is not raised when the steering angle is smaller than the predetermined value;
    a controller for setting the electric motor not to exceed predetermined revolutions when the detected steering angle is smaller than a predetermined value, and for performing control of revolutions of the electric motor in accordance with a steering angular velocity of the steering means when the steering angle exceeds the predetermined value, wherein the controller obtains a steering angular velocity of the steering means by using the steering angle detected by the steering angle detector, wherein when the steering angle is smaller than the predetermined value, a pressure of the hydraulic oil to be supplied to the hydraulic cylinder is not raised; and a connecting shaft for connecting the steering means and the steering mechanism, wherein a spring coefficient of the shaft is set to be a value in which the pressure of the hydraulic oil to be supplied to the hydraulic cylinder is not raised when the steering angle is smaller than the predetermined value.

8. The power steering apparatus according to claim 7, wherein the predetermined value for the steering angle is 3°.

9. A power steering apparatus for applying steer-assisting force to a steering mechanism in accordance with operations of a steering means, comprising:

a steering angle detector for detecting a steering angle of the steering means;

a control valve for which a hydraulic oil flows from a hydraulic pump that is driven by an electric motor, being located between the hydraulic pump and hydraulic cylinder for steer-assisting;

a controller for setting the electric motor not to exceed predetermined revolutions when the detected steering angle is smaller than a predetermined value, and for performing control of revolutions of the electric motor in accordance with a steering angular velocity of the steering means when the steering angle exceeds the predetermined value, wherein when the steering angle is smaller than the predetermined value, a pressure of the hydraulic oil to be supplied to the hydraulic cylinder is not raised; and wherein a final value of the steering angle at which the pressure of the hydraulic oil to be supplied to the hydraulic cylinder is not raised is an approximate value exceeding the predetermined value for the steering angle.

10. The power steering apparatus according to claim 9, wherein the predetermined value for the steering angle is 3°.

11. A power steering apparatus for applying steer-assisting force to a steering mechanism in, accordance with operations of a steering means, comprising:

a steering torque detector for detecting input torque that is applied to the steering means;

a control valve for which a hydraulic oil flows from a hydraulic pump that is driven by an electric motor, being located between the hydraulic pump and a hydraulic cylinder for steer-assisting;

a controller for setting the electric motor not to exceed predetermined revolutions when the input torque is smaller than a predetermined value, and for performing control of revolutions of the electric motor in accordance with a steering angular velocity of the steering means when the input torque exceeds the predetermined value, wherein when the input torque is smaller than the predetermined value, a pressure of the hydraulic oil to be supplied to the hydraulic cylinder is not raised; and a connecting shaft for connecting the steering means and the steering mechanism, wherein a spring coefficient of the shaft is set to be a value in which the pressure of the hydraulic oil to be supplied to the hydraulic cylinder is not raised when the input torque is smaller than the predetermined value.

12. The power steering apparatus according to claim 11, wherein the predetermined value for the input torque is 2 N·m.

13. A power steering apparatus for applying steer-assisting force to a steering mechanism in, accordance with operations of a steering means,, comprising:

a steering angle detector for detecting a steering angle of the steering means;

a steering torque detector for detecting input torque that is applied to the steering means;

a control valve for which a hydraulic oil flows from a hydraulic pump that is driven by an electric motor, being located between the hydraulic pump and a hydraulic cylinder for steer-assisting;

a controller for setting the electric motor not to exceed predetermined revolutions when the input torque is smaller than a predetermined value, and for performing control of revolutions of the electric motor in accordance with a steering angular velocity of the steering means when the input torque exceeds the predetermined value, wherein the controller obtains a steering angular velocity of the steering means by using the steering angle detected by the steering angle detector, wherein when the input torque is smaller than the predetermined value, a pressure of the hydraulic oil to be supplied to the hydraulic cylinder is not raised; and a connecting shaft for connecting the steering means and the steering mechanism, wherein a spring coefficient of the shaft is set to be a value in which the pressure of the hydraulic oil to be supplied to the hydraulic cylinder is not raised when the input torque is smaller than the predetermined value.

14. The power steering apparatus according to claim 13, wherein the predetermined value for the input torque is 2 N·m.

15. A power steering apparatus for applying steer-assisting force to a steering mechanism in, accordance with operations of a steering means, comprising:

a steering torque detector for detecting input torque that is applied to the steering means;

a control valve for which a hydraulic oil flows from a hydraulic pump that is driven by an electric motor, being located between the hydraulic pump and a hydraulic cylinder for steer-assisting, wherein the control valve is provided with throttles at flow passages for the hydraulic oil, each throttle having a throttle degree to which the pressure of the hydraulic oil to be supplied to the hydraulic cylinder is not raised when the input torque is smaller than the predetermined value;

a controller for setting the electric motor not to exceed predetermined revolutions when the input torque is smaller than a predetermined value, and for performing control of revolutions of the electric motor in accordance with a steering angular velocity of the steering means when the input torque exceeds the predetermined value, wherein when the input torque is smaller than the predetermined value, a pressure of the hydraulic oil to be supplied to the hydraulic cylinder is not raised; and a connecting shaft for connecting the steering means and the steering mechanism, wherein a spring coefficient of the shaft is set to be a value in which the pressure of the hydraulic oil to be supplied to the hydraulic cylinder is not raised when the input torque is smaller than the predetermined value.

16. The power steering apparatus according to claim 15, wherein the predetermined value for the input torque is 2 N·m.

17. A power steering apparatus for applying steer-assisting force to a steering mechanism in, accordance with operations of a steering means, comprising:

a steering angle detector for detecting a steering angle of the steering means;

a steering torque detector for detecting input torque that is applied to the steering means;

a control valve for which a hydraulic oil flows from a hydraulic pump that is driven by an electric motor, being located between the hydraulic pump and a hydraulic cylinder for steer-assisting, wherein the control valve is provided with throttles at flow passages for the hydraulic oil, each throttle having a throttle degree to which the pressure of the hydraulic oil to be supplied to the hydraulic cylinder is not raised when the input torque is smaller than the predetermined value;

a controller for setting the electric motor not to exceed predetermined revolutions when the input torque is smaller than a predetermined value, and for performing control of revolutions of the electric motor in accordance with a steering angular velocity of the steering means when the input torque exceeds the predetermined value, wherein when the input torque is smaller than the predetermined value, a pressure of the hydraulic oil to be supplied to the hydraulic cylinder is not raised; and a connecting shaft for connecting the steering means and the steering mechanism, wherein a spring coefficient of the shaft is set to be a value in which the pressure of the hydraulic oil to be supplied to the hydraulic cylinder is not raised when the input torque is smaller than the predetermined value.

18. The power steering apparatus according to claim 17, wherein the predetermined value for the input torque is 2 N·m.

19. A power steering apparatus for applying steer-assisting force to a steering mechanism in, accordance with operations of a steering means, comprising:

a steering torque detector for detecting input torque that is applied to the steering means;

a control valve for which a hydraulic oil flows from a hydraulic pump that is driven by an electric motor, being located between the hydraulic pump and a hydraulic cylinder for steer-assisting; and a controller for setting the electric motor not to exceed predetermined revolutions when the input torque is smaller than a predetermined value, and for performing control of revolutions of the electric motor in accordance with a steering angular velocity of the steering means when the input torque exceeds the predetermined value, wherein when the input torque is smaller than the predetermined value, a pressure of the hydraulic oil to be supplied to the hydraulic cylinder is not raised, wherein a final value of the input torque at which the pressure of the hydraulic oil to be supplied to the hydraulic cylinder is not raised is an approximate value exceeding the predetermined value for the input torque.

20. The power steering apparatus according to claim 19, wherein the predetermined value for the input torque is 2 N·m.

* * * * *